No. 796,362. PATENTED AUG. 1, 1905.
H. A. SHAULES.
THEATER APPLIANCE.
APPLICATION FILED JUNE 9, 1905.
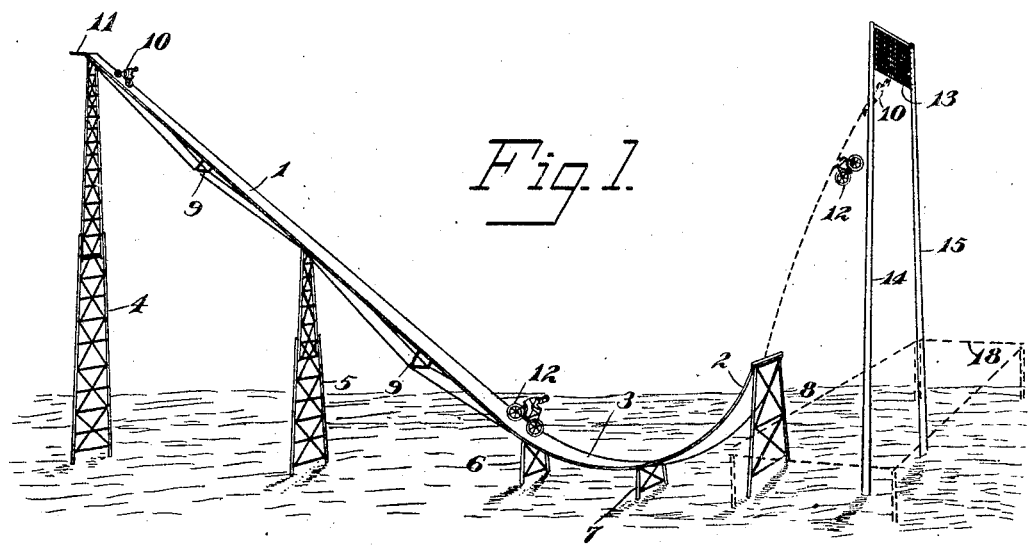
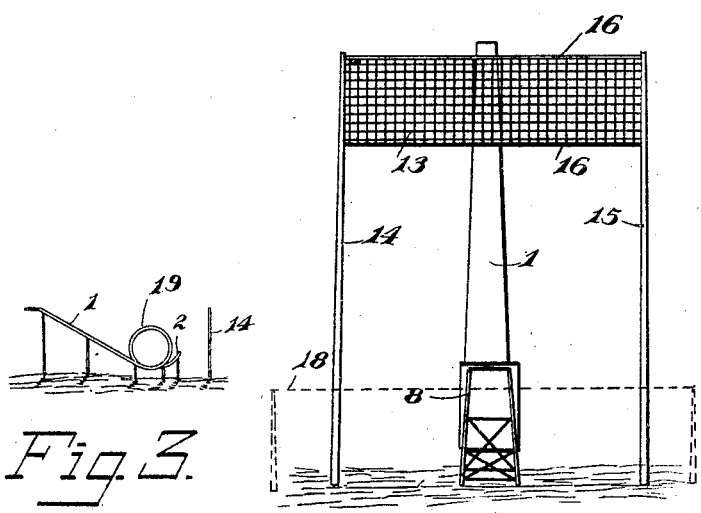
WITNESSES:
William M. Hilbert
William Freeman
INVENTOR
Herbert A. Shaules
BY
B. C. Stickney
ATTORNEY

UNITED STATES PATENT OFFICE.

HERBERT A. SHAULES, OF NEW YORK, N. Y.

THEATER APPLIANCE.

No. 796,362.      Specification of Letters Patent.      Patented Aug. 1, 1905.

Application filed June 9, 1905. Serial No. 264,479.

*To all whom it may concern:*

Be it known that I, HERBERT A. SHAULES, a citizen of the United States, residing in the borough of Brooklyn, city of New York, in the county of Kings and State of New York, have invented certain new and useful Improvements in Theater Appliances, of which the following is a specification.

This invention relates to apparatus for use in theatrical entertainments; and its object is to provide an apparatus for enabling the production of a novel and entertaining acrobatic feat which is apparently highly difficult and extremely dangerous, while ample provision is made for the safety of the performer.

In carrying out my invention I erect a track suitable for a bicycle and having an incline down which the bicycle and rider coast in order to gain impetus. At its lower end said incline merges into a sharp rise which terminates abruptly, so that the rider is caused by momentum to vault upwardly therefrom. The performer shakes off the bicycle and grasps a net which hangs high above the end of said rise, but still is in the path of the vaulter.

In the accompanying drawings, Figure 1 is a perspective view of my invention, showing three positions of the performer and his bicycle. Fig. 2 is an end elevation showing particularly the great width of the net which the performer catches at the termination of his ride. Fig. 3 shows a modification.

The bicycle-track, which is a smooth or plane surface, comprises a long incline 1 at one end and a short rise 2 at the other end, said incline merging into said rise by means of a curved portion 3. The track is supported upon standards or horses 4, 5, 6, 7, and 8. The longer standards 4 5 are made in sections, as shown, for convenience in constructing, taking apart, and transporting. The reaches of the track between the supports 4, 5, and 6 may be provided with trusses 9, so that the entire structure is strong and yet light. The bicycle-rider (indicated at 10) starts from a landing 11 and coasts down the incline 1 along the curve 3 and up the rise 2. The end of the latter is very much lower than the platform 11 and has a sharper upward slope than the incline 1, so as to give the rider and his bicycle 12 a nearly-vertical start for the vault. The direction taken by the vaulter is indicated by a dotted curved line at Fig. 1. The performer disengages himself from the bicycle, and is seen reaching for a net 13, hanging between a pair of poles 14 15, to which the ends of the net are attached. This net is of considerable height, so that even if the performer vaults higher at some times than at others he is not liable either to fly over the net or to fail to reach up to it. The net is also of great width, being in practice about sixteen feet wide and extending many feet upon each side of the bicycle-track, which is only about three feet wide. This great width is a great practical advantage, because the performer is liable when leaving the bicycle-track to vault either to the left or to the right. Such sidewise movement becomes an important matter when the vault is taken to great height, as illustrated. By provision of the extraordinarily wide net such sidewise movement is provided against, and the performer always finds the net in his path and is always able to grasp the same. The poles are preferably connected by upper and lower cross-bars 16, between which the net is stretched and upon which it is caught.

Thus it will be seen that at very low cost an apparatus can be produced for use either out-of-doors or in indoor performances, which may be rendered thrilling to the spectators without the necessity of unduly great skill or liability of danger to the performer.

If desired, a horizontal net (indicated at 18) may be provided for catching the bicycle when the latter is dropped by the performer.

At Fig. 3 a loop 19 is shown intervening between the incline 1 and the rise 2 at the place where the former merges into the latter.

Other variations may be resorted to within the scope of my invention.

Having thus described my invention, I claim—

1. A bicycle-track consisting at one end of a long downward incline and at the other end terminating in a short rise, said incline merging into said rise, in combination with a net in advance of said rise and high above the same, and hanging down in the path of a rider vaulting from said rise.

2. A bicycle-track consisting at one end of a long downward incline and at the other end of a short rise, said incline merging into said rise, and the latter having a steeper slope than said long incline, in combination with a net hanging down in the path of a rider vaulting from said rise; said net being much greater in width than the bicycle-track and extending far to each side of the latter, and at a short distance away from and high above the termination of said rise.

3. A bicycle-track consisting at one end of a long downward incline and at the other end of a short sharp rise, said incline merging into said rise, and a net hanging down at a distance from the end of the rise and in the path of a rider vaulting from said rise; said net having great width and extending a distance of many feet at each side of said bicycle-track, and a pair of poles between which said net is hung.

HERBERT A. SHAULES.

Witnesses:
   B. C. STICKNEY,
   BERTHA SCHNIER.